(12) United States Patent
Yeh et al.

(10) Patent No.: US 9,503,190 B2
(45) Date of Patent: Nov. 22, 2016

(54) CLIENT-SIDE DYNAMIC MULTI-ROUTING POWER DISTRIBUTION SYSTEM OF FTTX OPTICAL TERMINAL EQUIPMENT

(71) Applicant: Chunghwa Telecom Co., Ltd., Taoyuan County (TW)

(72) Inventors: Li-Chia Yeh, Taoyuan County (TW); Ching-Sheu Wang, Taoyuan County (TW); Jhih-Dao Jhan, Taoyuan County (TW); Kuo-Hsiang Lai, Taoyuan County (TW); Rong-Ruey Lee, Taoyuan County (TW)

(73) Assignee: CHUNGHWA TELECOM CO., LTD., Taoyuan County (TW)

( * ) Notice: Subject to any disclaimer, the term of this patent is extended or adjusted under 35 U.S.C. 154(b) by 757 days.

(21) Appl. No.: 13/743,335

(22) Filed: Jan. 17, 2013

(65) Prior Publication Data
US 2014/0003816 A1    Jan. 2, 2014

(30) Foreign Application Priority Data

Jun. 28, 2012  (TW) .............................. 101123151 A

(51) Int. Cl.
*H04L 12/10* (2006.01)
*H04B 10/27* (2013.01)
*H04L 12/28* (2006.01)

(52) U.S. Cl.
CPC .............. *H04B 10/27* (2013.01); *H04L 12/10* (2013.01); *H04L 12/2834* (2013.01); *H04L 12/2898* (2013.01); *Y02B 70/325* (2013.01); *Y04S 20/228* (2013.01)

(58) Field of Classification Search
CPC   H04L 12/00; H04L 12/2898; H04L 12/2834
See application file for complete search history.

(56) References Cited

U.S. PATENT DOCUMENTS

| | | | | |
|---|---|---|---|---|
| 6,804,616 B2 * | 10/2004 | Bodas | ................ | H05K 7/20836 702/61 |
| 7,002,331 B2 * | 2/2006 | Sae-Ueng | ............... | H02M 3/28 323/299 |
| 7,173,397 B2 * | 2/2007 | Kinoshita | ........... | B60L 11/1851 320/134 |
| 7,317,793 B2 * | 1/2008 | Binder | .................. | H04M 19/08 379/413 |
| 7,580,732 B2 * | 8/2009 | Bailey | ................... | H04M 1/738 370/216 |
| 8,155,526 B2 * | 4/2012 | Gray | ................... | H04J 14/0245 370/463 |
| 8,205,099 B2 * | 6/2012 | Hussain | ............ | H04L 12/40045 713/300 |
| 2008/0297364 A1 * | 12/2008 | Soderland | .............. | G01R 31/40 340/654 |
| 2009/0060531 A1 * | 3/2009 | Biegert | ............... | H04L 12/2856 398/214 |
| 2011/0307110 A1 * | 12/2011 | Sharma | ..................... | G06F 1/26 700/291 |
| 2013/0169042 A1 * | 7/2013 | Melamed | ................ | H04L 12/10 307/18 |

* cited by examiner

*Primary Examiner* — Thienvu Tran
*Assistant Examiner* — Pinping Sun
(74) *Attorney, Agent, or Firm* — Chun-Ming Shih

(57) ABSTRACT

A client-side dynamic multi-routing power distribution system of an optical terminal equipment integrates the Power over Ethernet, dynamic multi-routing power distribution and power management technologies to dispatch power to the optical terminal equipment from a home gateway to meet power demands of the off-premise optical terminal equipment and to greatly reduce the cost for laying power lines for the off-premise FTTx optical terminal equipment, thereby expanding the coverage of optical fiber broadband service. The client-side dynamic multi-routing power distribution system includes (1) a network signal processing and DC power supply module of the home gateway for dispatching power to the remote FTTx optical terminal equipment through a telecom line at a network interface; (2) a network signal processing and DC powered module of the FTTx optical terminal equipment for handling multi-routing power distribution and dynamic load balancing from a plurality of home gateways.

6 Claims, 3 Drawing Sheets

CLIENT-SIDE DYNAMIC MULTI-ROUTING POWER DISTRIBUTION SYSTEM OF FTTX OPTICAL TERMINAL EQUIPMENT

BACKGROUND OF THE INVENTION

1. Field of the Invention

The present invention relates to a client-side dynamic multi-routing power distribution system of a FTTx optical terminal equipment, and more particularly, to a client-side dynamic multi-routing power distribution system integrating the Power over Ethernet, dynamic multi-routing power distribution and power management technologies to dispatch DC power to the optical terminal equipment from DC power supply modules of a plurality of home gateways.

2. Description of the Prior Art

Recently, the booming cloud service has prompted carriers to accelerate broadband infrastructure construction and to provide competitive pricing strategy, thereby creating explosive demands and increasing number of subscribers. However, due to various factors such as too many broadband access network technologies applied today, uncertain deployment schedule, and high construction cost for laying fiber cable, etc., have somewhat impeded the deployment of FTTx. The penetration rate of FTTx would be greatly improved if the optical terminal equipment can be moved from the optical splice box to the copper cable splice box which is within a 100-meter range of the subscribers and also combined with VDSL access network technology.

However, the FTTx optical terminal equipment presently available on the market all use local utility power such as a 110 VAC/220 VAC power source or a 48 VDC power source, if the FTTx optical terminal equipment is to be moved to the copper cable splice box, since the number of copper cable splice boxes is more than that of the optical splice boxes, there will be more FTTx optical terminal equipments needed to meet the demands of distributed subscribers. In other words, each FTTx optical terminal equipment is responsible for a less number of subscriber than before; when the network infrastructure is evolving to become more miniaturized and distributed, the number of the power sources has to increase as well, which causes the cost of maintenance and construction of power sources to increase and makes it difficult to predict the deployment schedule of power distribution environment.

Some have proposed a solution of using a remote office to supply power to the optical terminal equipment to provide an available power source and to reduce maintenance and construction cost. Presently the 380 VDC standard for power distribution can be used to supply power to the FTTx optical terminal equipment from the central office. Although using high voltage DC power signal can enhance the power distribution efficiency and expand the power distribution range, there could be safety concerns for on-site operations due to high voltage source, and it is not energy-saving to transmit such a high voltage DC power signal over a lengthy distance. Therefore, it is necessary to improve the present power distribution environment of the FTTx optical terminal equipment.

Therefore, the prior art power distribution system of the optical terminal equipment presents several shortcomings to be overcome.

In view of the above-described deficiencies of the traditional power distribution system of the optical terminal equipment, after years of constant effort in research, the inventor of this invention has consequently developed and proposed a client-side dynamic multi-routing power distribution system of a FTTx optical terminal equipment.

SUMMARY OF THE INVENTION

It is an object of the present invention to provide a client-side dynamic multi-routing power distribution system, which uses one or more than one DC power supply modules of home gateways connected to the optical terminal equipment to provide power to the optical terminal equipment. The present invention solves the problems caused by moving the FTTx optical terminal equipment from the optical splice box to the copper cable splice box, such as requiring to deploy a new power distribution environment, high maintenance and construction costs, etc.

In order to achieve the above object, the present invention proposes a client-side dynamic multi-routing power distribution system of a FTTx optical terminal equipment, which integrates the Power over Ethernet, dynamic multi-routing power distribution and power management technologies to dispatch power to the FTTx optical terminal equipment from a home gateway to meet power demands of the off-premise optical terminal equipment and to greatly reduce the cost for laying power lines for the off-premise FTTx optical terminal equipment, thereby expanding the coverage of optical fiber broadband service. The client-side dynamic multi-routing power distribution system comprises (1) a network signal processing and DC power supply module of the home gateway for dispatching power to the remote FTTx optical terminal equipment through a telecom line at a network interface; (2) a network signal processing and DC powered module of the FTTx optical terminal equipment for handling multi-routing power distribution and dynamic load balancing from a plurality of home gateways. The client-side dynamic multi-routing power distribution system comprises a network signal processing and DC power supply module of the home gateway for dispatching power to the remote FTTx optical terminal equipment through a telecom line at a network interface; a network signal processing and DC powered module of the FTTx optical terminal equipment for handling multi-routing power distribution and dynamic load balancing from a plurality of home gateways; the client-side dynamic multi-routing power distribution system integrates the network signal and the DC power signal to the same client side network interface, wherein one pair of lines is provided for voice and network communication, another pair of lines is provided for network connection and power distribution with the home gateway; the client-side dynamic multi-routing power distribution system calculates the power consumption of the FTTx optical terminal equipment according to the sum of the client connection times provided by the plurality of network signal processing modules, and calculates the supplied power capacity of each one of the plurality of home gateways according to the connection times of each client provided by each one of the plurality of network signal processing modules; the client-side dynamic multi-routing power distribution system also comprises a power management mechanism to provide a powered state monitoring and an abnormal power supply alert.

DETAILED DESCRIPTION OF THE PREFERRED EMBODIMENT

Figure 1:
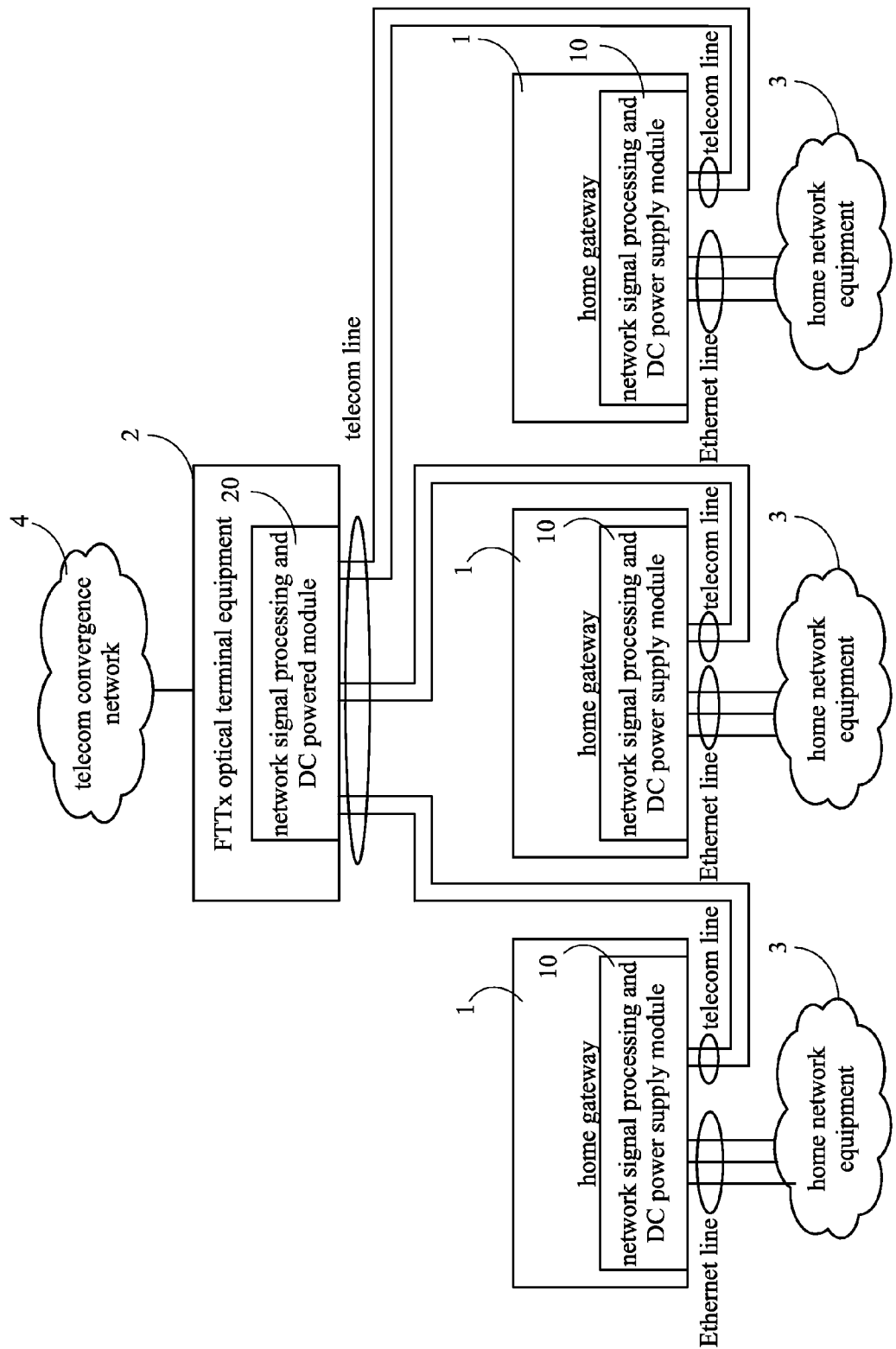
FIG. 1 illustrates a structural view of a client-side dynamic multi-routing power distribution system of a FTTx optical terminal equipment of the present invention.

Please refer to FIG. 1 for the structural view of the client-side dynamic multi-routing power distribution system of the FTTx optical terminal equipment, which comprises a plurality of home gateways 1 and a FTTx optical terminal equipment 2. Each home gateway 1 is connected to the optical terminal equipment 2 through a telecom line for network access, so a home network equipment 3 connected to the home gateway 1 can be connected to a telecom convergence network 4 through the FTTx optical terminal equipment 2 for network access, wherein the telecom line not only connects the FTTx optical terminal equipment 2 and the home gateway 1 for transmitting a network signal, the telecom line also transmits a DC power signal provided by a network signal processing and DC power supply module 10 of the home gateway 1 to the FTTx optical terminal equipment 2 to provide DC power to the FTTx optical terminal equipment 2. The FTTx optical terminal equipment 2 receives the network signal and DC power signal from each home gateway 1 and uses a network signal processing and DC powered module 20 of the optical terminal equipment 2 to process the network access of the home gateway 1 and uses the DC power signal for powering the FTTx optical terminal equipment 2.

Figure 2:
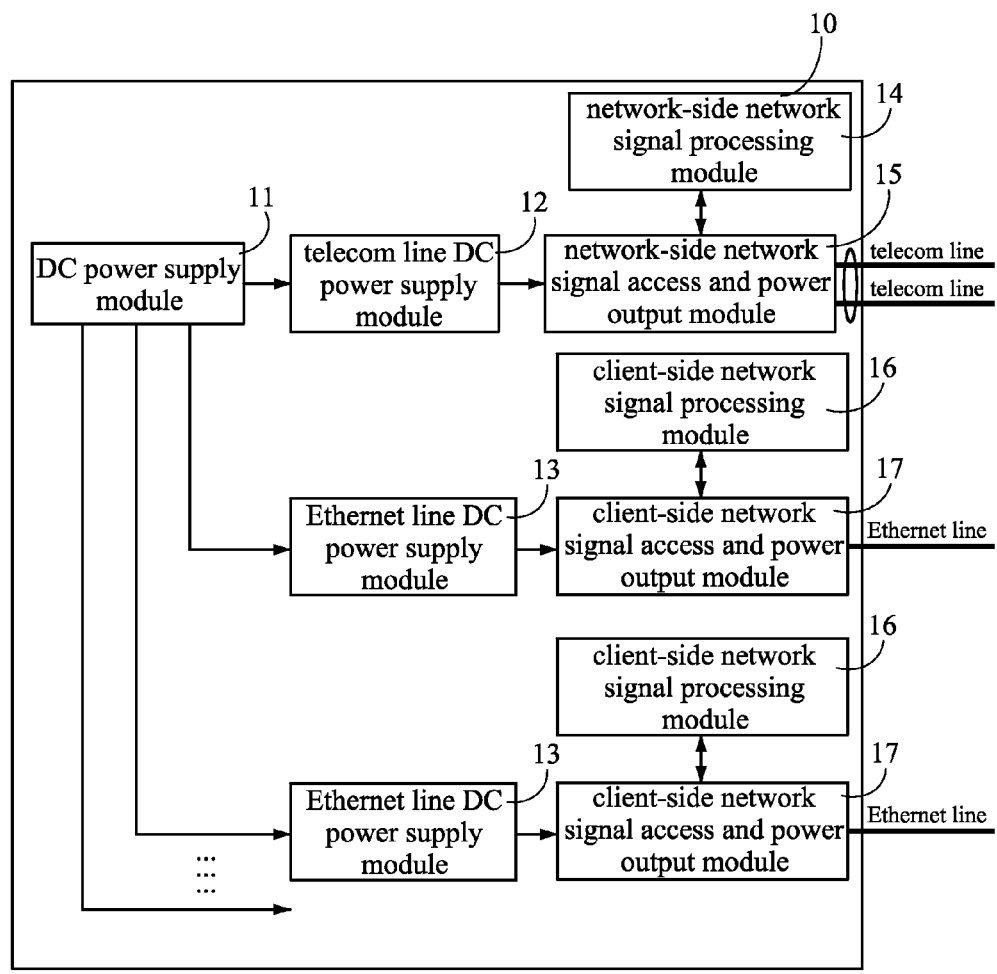
FIG. 2 illustrates a block diagram of a network signal processing and DC power supply module of the home gateway of the client-side dynamic multi-routing power distribution system of the FTTx optical terminal equipment.

Please refer to FIG. 2 for a block diagram of a network signal processing and DC power supply module 10 of the home gateway 1 of the client-side dynamic multi-routing power distribution system of the FTTx optical terminal equipment, which comprises a DC power supply module 11, a telecom line DC power supply module 12, a plurality of Ethernet line DC power supply module 13, a network-side network signal processing module 14, a network-side network signal access and power output module 15, a plurality of client-side network signal processing module 16, and a plurality of client-side network signal access and power output module 17. In this figure, the DC power supply module 11 provides a DC power signal to the home gateway 1 and dispatching power to a telecom line DC power supply module 12 and a plurality of Ethernet line DC power supply modules 13; the telecom line DC power supply module 12 modulates the DC power signal to a DC voltage level of the telecom line and then transmits the DC power signal to the network-side network signal access and power output module 15; the network-side network signal access and power output module 15 combines and transmits the DC power signal and the network signal accessed by the network-side network signal processing module 14 to the optical terminal equipment 2 through the telecom line; the Ethernet line DC power supply modules 13 modulates the DC power signal to a DC power level of the Ethernet line and then transmits the DC power signal to the client-side network signal access and power output module 17; the client-side network signal access and power output module 17 combines and transmits the DC power signal and the network signal accessed by the client-side network signal processing module 16 to the home network equipment 3 through the Ethernet line for providing DC power and network signal access to the home network equipment 3; when a power failure is happened to the home gateway 1, the network-side network signal processing module 14 transmits a power failure information to the FTTx optical terminal equipment before the FTTx optical terminal equipment stops operation.

Figure 3:
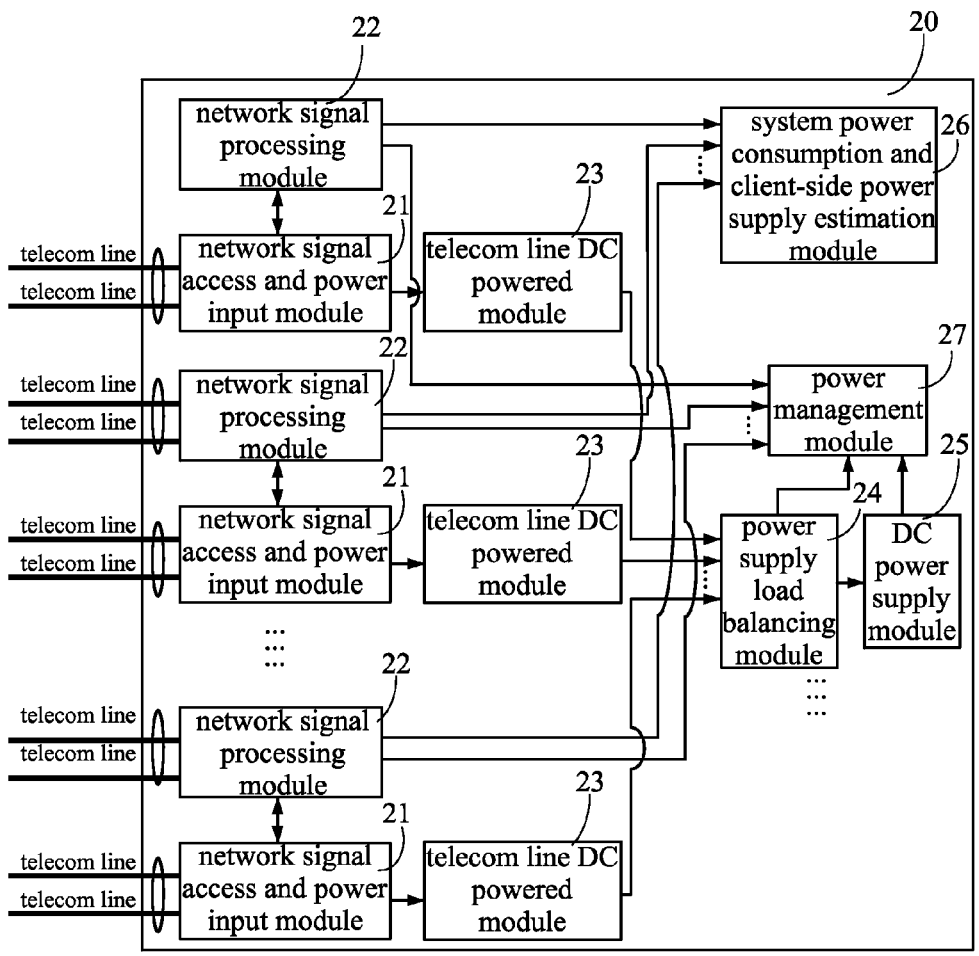
FIG. 3 illustrates a block diagram of a network signal processing and DC powered module of the FTTx optical terminal equipment of the client-side dynamic multi-routing power distribution system of the FTTx optical terminal equipment.

Please refer to FIG. 3 for a block diagram of a network signal processing and DC powered module 20 of the FTTx optical terminal equipment 2 of the client-side dynamic multi-routing power distribution system of the FTTx optical terminal equipment 2. The network signal processing and DC powered module 20 comprises a plurality of network signal access and power input modules 21, a plurality of network signal processing module 22, a plurality of telecom line DC powered modules 23, a power supply load balancing module 24, a DC power supply module 25, a system power consumption and client-side power supply estimation module 26, and a power management module 27. In the block diagram, the network signal access and power input module 21 processes the network signal and the DC power signal from the telecom line and then transmits the network signal to the network signal processing module 22 and transmits the DC power signal to the telecom line DC powered module 23; the network signal processing module 22 processes network traffic and receives the power failure information of the remote home gateway 1, the network signal processing module 22 automatically enables a sleep mode to reduce power consumption when the network signal processing module 22 is not connected with the home gateway 1 for a predetermined period of time. The telecom line DC powered module 23 modulates the DC power signal to a DC power level required by the FTTx optical terminal equipment 2 and transmits the DC power signal to a power supply load balancing module 24; the power supply load balancing module 24 receives the DC power signal of each one of the plurality of home gateways 1 and evenly distributing the load current of each DC power signal, and then outputs each DC power signal to the DC power supply module 25; the DC power supply module 25 provides DC power to the FTTx optical terminal equipment 2; the system power consumption and client-side power supply estimation module 26 calculates the power consumption of the FTTx optical terminal equipment 2 according to the sum of the client connection times provided by the plurality of network signal processing modules 22, and calculates the supplied power capacity of each one of the plurality of home gateways 1 according to the connection times of each client provided by each one of the plurality of network signal processing modules 22; the power management module 27 detects the power supply load balancing module 24 and the DC power supply module 25 in real time to provide a powered state monitoring and an abnormal power supply alert; when a power failure occurs at the client side, the power management module 27 compares the remote home gateway 1 power failure information provided by the network signal processing module 22 with a predetermined data to provide an abnormal power supply classification of the client side regarding to a lost telecom line connection and a home gateway power failure.

The present invention provides a client-side dynamic multi-routing power distribution system of a FTTx optical terminal equipment, while compared with prior art techniques, is advantageous in:

(1) The present invention provides a fast, dynamic, and easy power distribution system for the FTTx optical terminal equipment.

(2) The present invention can shorten the copper loop to within a 100 meter range of the subscriber to overcome the power distribution problem and expand the coverage of optical fiber broadband service.

(3) The present invention can improve the deployment flexibility of a FTTx network by placing the FTTx optical terminal equipment at any desired location as if it is in the passive optical network (PON) without worrying about the power distribution problem.

(4) The present invention can upgrade the present copper cable slice box to fiber splice box to make use of the existing location.

(5) The present invention uses the existing power supply for power distribution, thereby eliminating the need for building extra power grid and greatly reducing the maintenance and construction cost.

(6) The present invention proposes a simple method for estimating system power consumption and supplied power capacity of each subscriber to greatly reduce the calculation of power consumption and supplied power capacity.

(7) The present invention uses the home gateway to provide integrated power supply for the home network equipment to facilitate the application of optical terminal equipment and to save energy.

(8) The present invention facilitates the use of the FTTx optical terminal equipment with home power supply to power the FTTx optical terminal equipment, thereby eliminating the need for laying additional power line by the utility company or with the approval of the government agency; besides, it is possible to provide a stable, reliable power source with easy maintenance, thereby reducing the possibility of power failure and the cost of maintenance.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A client-side dynamic multi-routing power distribution system of a Fiber to the x (FTTx) optical terminal equipment, comprising:
   a plurality of network signal processing and DC power supply modules each integrated in a home gateway, each one of the plurality of network signal processing and DC power supply modules connecting to the optical terminal equipment through only two pairs of telecom lines, wherein one of the only two pairs of telecom lines is provided for voice and network communication for a home network equipment connected to the home gateway to access a network service through the FTTx optical terminal equipment connected to a telecom convergence network, while the other one of the only two pairs of telecom lines is provided for dispatching DC power to the FTTx optical terminal equipment, and the home gateway and the home network equipment are connected and powered through an Ethernet line; and
   a network signal processing and DC powered module integrated in the FTTx optical terminal equipment, the network signal processing and DC powered module processing the network signal of the home gateway and being powered by the DC power supplied by the plurality of home gateways;
   wherein the network signal processing and DC powered module comprises:
   a plurality of network signal access and power input modules processing the network signal and the DC power signal from the telecom line and then transmitting the network signal to the network signal processing module and transmitting the DC power signal to the telecom line DC powered module;
   a plurality of network signal processing modules accessing the network signal of the home gateway;
   a plurality of telecom line DC powered modules modulating the DC power signal to a DC power level required by the FTTx optical terminal equipment and transmitting the DC power signal to a power supply load balancing module;
   the power supply load balancing module receiving the power signal of each one of the plurality of home gateways and evenly distributing the load current of each DC power signal, and then outputting each DC power signal to the DC power supply module;
   the DC power supply module providing DC power to the FTTx optical terminal equipment;
   a power management module detecting the power supply load balancing module and the DC power supply module in real time to provide a powered state monitoring and an abnormal power supply alert; and
   a system power consumption and client-side power supply estimation module providing an estimation of the power consumption of the FTTx optical terminal equipment and a supplied power capacity of each home gateway.

2. The client-side dynamic multi-routing power distribution system of a FTTx optical terminal equipment client-side dynamic multi-routing power distribution system as claimed in claim 1, wherein the network signal processing and DC power supply module comprises:
   a DC power supply module providing a DC power signal to the home gateway and dispatching power to a telecom line DC power supply module and a plurality of Ethernet line DC power supply modules;
   the telecom line DC power supply module modulating the DC power signal to a DC voltage level of the telecom line and then transmitting the DC power signal to a network-side network signal access and power output module;
   a network-side network signal processing module accessing the network signal of the FTTx optical terminal equipment;
   the network-side network signal access and power output module combining and transmitting the DC power signal and the network signal accessed by the network-side network signal processing module to the optical terminal equipment through the telecom line;
   the plurality of Ethernet line DC power supply modules modulating the DC power signal to a DC power level of the Ethernet line and then transmitting the DC power signal to a client-side network signal access and power output module;
   a plurality of client-side network signal processing module accessing the network signal of the home network equipment; and
   a plurality of client-side network signal access and power output modules combining and transmitting the DC power signal and the network signal accessed by the plurality of client-side network signal processing modules to the home network equipment through the Ethernet line for providing DC power and network signal access to the home network equipment.

3. The client-side dynamic multi-routing power distribution system of a Fiber to the x (FTTx) optical terminal equipment client-side dynamic multi-routing power distribution system as claimed in claim 2, when a power failure is happened to the home gateway, the network-side network signal processing module transmits a power failure information to the FTTx optical terminal equipment before the FTTx optical terminal equipment stops operation.

4. The client-side dynamic multi-routing power distribution system of a Fiber to the x (FTTx) optical terminal equipment client-side dynamic multi-routing power distribution system as claimed in claim 1, wherein the network signal processing module processes network traffic and receives the remote home gateway power failure information, and the network signal processing module automatically enables a sleep mode to reduce power consumption when the network signal processing module is not connected with the home gateway for a predetermined period of time.

5. The client-side dynamic multi-routing power distribution system of a Fiber to the x (FTTx) optical terminal equipment client-side dynamic multi-routing power distribution system as claimed in claim 1, when a power failure occurs at the client side, the power management module compares the remote home gateway power failure information provided by the network signal processing module with a predetermined data to provide an abnormal power supply classification of the client side regarding to a lost telecom line connection and a home gateway power failure.

6. The client-side dynamic multi-routing power distribution system of a Fiber to the x (FTTx) optical terminal equipment client-side dynamic multi-routing power distribution system as claimed in claim 1, wherein the system power consumption and client-side power supply estimation module calculates the power consumption of the FTTx optical terminal equipment according to the sum of the client connection times provided by the plurality of network signal processing modules, and calculates the supplied power capacity of each one of the plurality of home gateways according to the connection times of each client provided by each one of the plurality of network signal processing modules.

\* \* \* \* \*